(12) United States Patent
Batenburg et al.

(10) Patent No.: US 10,210,116 B2
(45) Date of Patent: Feb. 19, 2019

(54) METHOD, APPARATUS, AND SYSTEM FOR SEMAPHORE-BASED PROTECTION OF POWER-DOMAIN-CROSSING SIGNALS

(71) Applicant: QUALCOMM Incorporated, San Diego, CA (US)

(72) Inventors: Michael Kevin Batenburg, San Diego, CA (US); Vincent Pierre Le Roy, San Diego, CA (US); Praveen Kumar Origanti, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 168 days.

(21) Appl. No.: 15/499,247

(22) Filed: Apr. 27, 2017

(65) Prior Publication Data

US 2018/0314659 A1    Nov. 1, 2018

(51) Int. Cl.
| | |
|---|---|
| *G06F 13/42* | (2006.01) |
| *G06F 13/362* | (2006.01) |
| *G06F 13/40* | (2006.01) |
| *G06F 9/52* | (2006.01) |

(52) U.S. Cl.
CPC .......... *G06F 13/362* (2013.01); *G06F 1/3287* (2013.01); *G06F 9/52* (2013.01); *G06F 13/4068* (2013.01)

(58) Field of Classification Search
None
See application file for complete search history.

(56) References Cited

U.S. PATENT DOCUMENTS

| | | | | |
|---|---|---|---|---|
| 7,610,572 | B2* | 10/2009 | Kanno | H01L 27/0207 |
| | | | | 716/138 |
| 7,673,163 | B2 | 3/2010 | Tsukimori et al. | |
| 7,774,017 | B2 | 8/2010 | Irita et al. | |
| 7,982,498 | B1* | 7/2011 | Chen | H03K 19/0016 |
| | | | | 326/21 |
| 8,494,477 | B2* | 7/2013 | Ravichandran ... | H04W 52/0274 |
| | | | | 455/343.1 |
| 8,994,402 | B2* | 3/2015 | Hwang | H03K 19/018507 |
| | | | | 326/80 |
| 9,098,270 | B1 | 8/2015 | Tiyyagura et al. | |
| 9,268,901 | B1* | 2/2016 | Sood | G06F 17/5081 |
| 9,276,575 | B2* | 3/2016 | Jayapal | H03K 19/003 |

(Continued)

OTHER PUBLICATIONS

International Search Report and Written Opinion—PCT/US2018/029038—ISA/EPO—dated Aug. 1, 2018.

*Primary Examiner* — Cheng Yuan Tseng
(74) *Attorney, Agent, or Firm* — Qualcomm Incorporated

(57) ABSTRACT

In certain aspects of the disclosure, an apparatus includes first and second semaphore registers disposed in a first power domain. A common address bus is coupled to the first and second semaphore registers, and a semaphore lock is disposed in the first power domain and coupled to the first and second semaphore registers. The semaphore lock is controlled by the first and second semaphore registers, and controls whether a signal from a second power domain is permitted to propagate to the first power domain. The first and second semaphore registers may be associated with first and second register addresses, respectively, which are selected to provide a substantially maximized Hamming distance between them. The first and second semaphore registers may have a write order expectation enforced between them.

22 Claims, 4 Drawing Sheets

(56) References Cited

U.S. PATENT DOCUMENTS

| | | | |
|---|---|---|---|
| 9,407,264 B1 * | 8/2016 | Ali | H03K 19/0016 |
| 9,929,741 B1 * | 3/2018 | Hsia | H03M 1/742 |
| 2016/0132451 A1 | 5/2016 | Cho et al. | |
| 2016/0210260 A1 | 7/2016 | Case et al. | |

* cited by examiner

METHOD, APPARATUS, AND SYSTEM FOR SEMAPHORE-BASED PROTECTION OF POWER-DOMAIN-CROSSING SIGNALS

BACKGROUND

Field

Aspects of the present disclosure relate generally to signal integrity, and more particularly to protecting signals which cross power domains from corruption as a result of power loss.

Background

Integrated circuits may include multiple power domains, in which each power domain may be powered by a separate supply rail. Having multiple power domains allows circuits in different power domains to be powered at different supply voltages, and allows the power domains to be independently power collapsed such that one power domain may be powered while another power domain is power collapsed. However, collapsing the power for a source power domain means that signals originating from the source domain but crossing into a destination non-power-collapsed power domain must be protected, so that the resulting signal in the destination power domain does not become corrupted.

One way of ensuring that domain-crossing signals are not corrupted is to use isolation cells. Isolation cells are circuits that block all activity coming from the source power domain, such that the domain-crossing signal cannot be corrupted by the source power domain being power collapsed. In order for isolation cells to be effective, they are activated prior to the power collapse of the source domain. However, this involves added complexity, as the isolation cells are activated by control circuitry which remains powered during power collapse of the source domain and which must be capable of determining that a power collapse is imminent.

Thus, it would be desirable to provide a solution for ensuring that domain-crossing signals do not become corrupted, without the added complexity and overhead of a specific control circuit as described above.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect, an apparatus includes first and second semaphore registers disposed in a first power domain. The apparatus further includes a common address bus coupled to the first and second semaphore registers. The apparatus further includes a semaphore lock disposed in the first power domain and coupled to the first and second semaphore registers. The semaphore lock is adapted to be controlled by the first and second semaphore registers. The semaphore lock is further adapted to control whether a signal from a second power domain is permitted to propagate to the first power domain.

In another aspect, a method includes addressing a first semaphore register in a first power domain by a first register address and writing a first unlock value into the semaphore register. The method further includes addressing a second semaphore register in the first power domain by a second register address and writing a second unlock value into the second semaphore register. The method further includes controlling a semaphore lock by the first semaphore register and the second semaphore register to allow a signal form a second power domain to propagate to the first power domain.

In another aspect, an apparatus includes first and second means for storing a semaphore value disposed in a first power domain. The apparatus further includes a means for commonly addressing the means for storing coupled to the first and second means for storing a semaphore value. The apparatus further includes a means for locking disposed in the first power domain and coupled to the first and second means for storing a semaphore value. The means for locking is adapted to be controlled by the first and second means for storing a semaphore value. The means for locking is further adapted to control whether a signal from a second power domain is permitted to propagate to the first power domain.

In another aspect, a non-transitory computer readable medium includes instructions which, when executed by a processor, cause the processor to address a first semaphore register in a first power domain by a first register address during a first clock cycle and write a first unlock value in the first semaphore register. The instructions further cause the processor to address a second semaphore register in the first power domain by a second register address during a second cycle subsequent to the first cycle and write a second unlock value into the second semaphore register. The instructions further cause the processor to control a semaphore lock by the first semaphore register and the second semaphore register to allow a signal from a second power domain to propagate to the first power domain.

One advantage of one or more disclosed aspects is that the disclosed aspects mitigate against the possibility that the semaphore lock may be erroneously released (and, thus, signals from the source power domain may arrive in a corrupted state in the destination power domain) during a single clock cycle.

DETAILED DESCRIPTION

Aspects of the inventive teachings herein are disclosed in the following description and related drawings directed to specific aspects. Alternate aspects may be devised without departing from the scope of the inventive concepts herein. Additionally, well-known elements of the environment may not be described in detail or may be omitted so as not to obscure the relevant details of the inventive teachings herein.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the invention. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Figure 1:
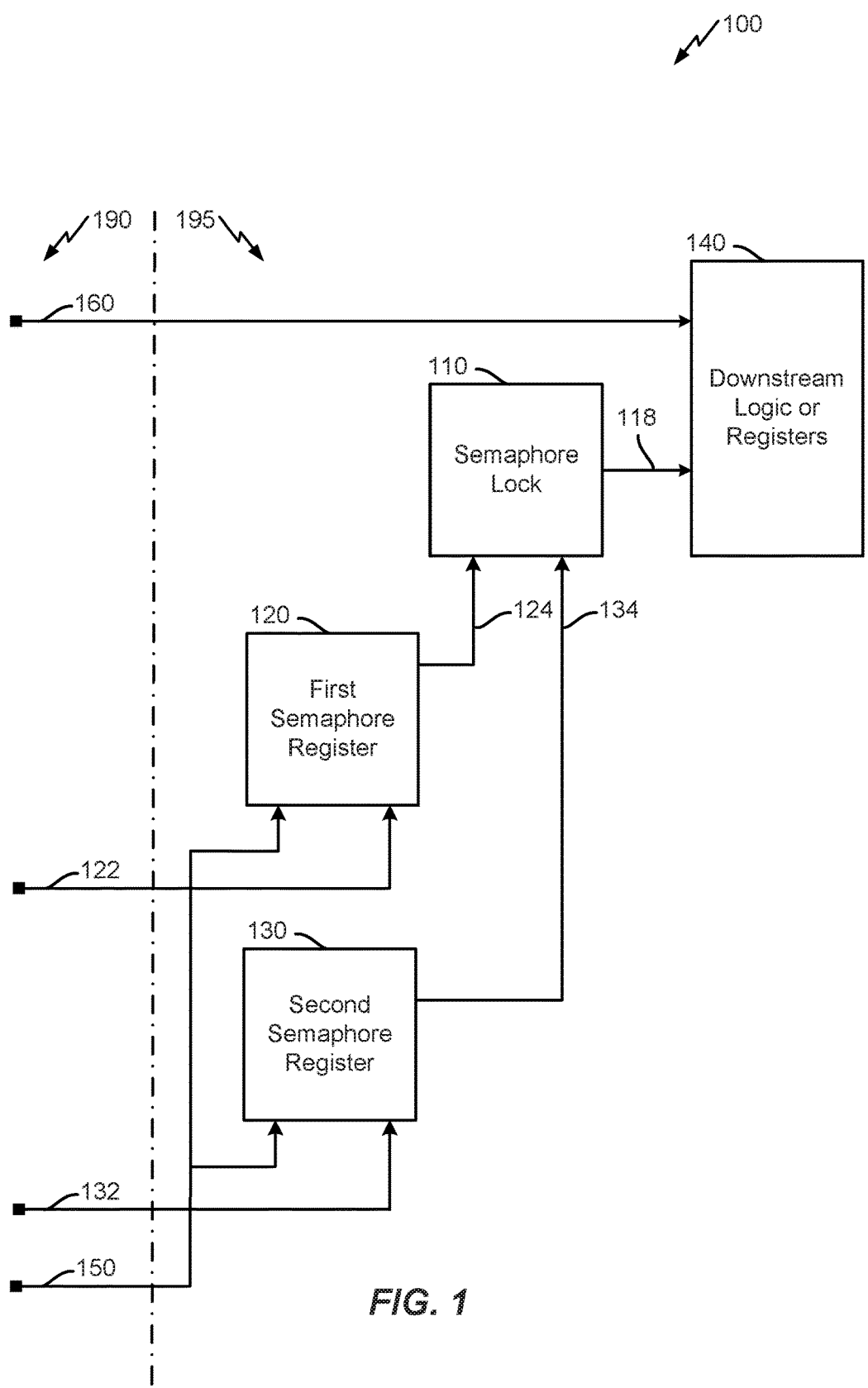
FIG. 1 shows a block diagram of a semaphore-based protection apparatus according to certain aspects of the present disclosure.

Aspects of the present disclosure include an apparatus for semaphore-based protection of power-domain-crossing signals. In this regard, FIG. 1 illustrates an exemplary apparatus 100 including a semaphore lock 110 disposed in a first power domain 195, which is operable to provide protection of downstream logic or registers 140 with respect to a signal 160. In this regard, the semaphore lock 118 provides a protection signal 118 to the downstream logic or registers 140 that prevents signal 160 from propagating in a manner that would corrupt the functionality of the downstream logic or registers 140. Signal 160 has its source in a second power domain 190 and has a destination (in one aspect, the downstream logic or registers 140) in the first power domain 195.

In order to generate the protection signal 118, the semaphore lock 110 is responsive to a first semaphore register input 124 and a second semaphore register input 134. When the first semaphore register input 124 and the second semaphore register input 134 are equal to their associated unlock values, the semaphore lock 110 generates the protection signal 118 at a value that allows the signal 160 to propagate to the downstream logic or registers 140. When either the first semaphore register input 124 or the second semaphore register input 134 does not equal its associated unlock value, the semaphore lock 110 generates the protection signal 118 at a value that does not allow the signal 160 to propagate to the downstream logic or registers 140.

The first semaphore register 120 provides the first semaphore register input 124, based on a value currently stored in the first semaphore register 120. The value is written into the first semaphore register 120 via a first semaphore value input 122, and responsive to the first semaphore register 120 having its associated first semaphore register address asserted on a common address bus 150. Likewise, the second semaphore register 130 provides the second semaphore register input 134, based on a value currently stored in the second semaphore register 120. The value is written into the second semaphore register 130 via a second semaphore value input 132, and responsive to the second semaphore register 130 having its associated second semaphore register address asserted on the common address bus 150. In one aspect, the first semaphore value input 122 and the second semaphore value input 132 have their sources in the second power domain 190. However, in other aspects either or both of the first semaphore value input 122 and the second semaphore value input 132 could also have their source in the first power domain 195.

The common address bus 150 being used to address both the first semaphore register 120 and the second semaphore register 130 ensures that only one of the first semaphore register 120 and the second semaphore register 130 may be written in a given clock cycle. Thus, the probability that a source of error can cause the semaphore lock 110 to erroneously allow the signal 160 to propagate to downstream logic or registers 140 is significantly reduced, since both the first semaphore register 120 and the second semaphore register 130 must provide their associated unlock values, in order for the semaphore lock 110 to allow the signal 160 to propagate. In one aspect, the common address bus 150 has its source in the second power domain 190. However, in other aspects the common address bus 150 could have its source in the first power domain 195.

In some aspects, the first semaphore register 120 and the second semaphore register 130 may have a particular write order expectation (e.g. the first semaphore register 120 must be written before the second semaphore register 130). The write order expectation may be enforced by hardware, for example by using the value in the first semaphore register 120 to determine whether or not the second semaphore register 130 is permitted to be written to. Such write order enforcement may be respected software such as an operating system or kernel by scheduling the writes in the order expected by the hardware. Those having skill in the art will recognize that other hardware and software implementations of the write order enforcement are possible, and are contemplated within the scope of this disclosure.

In order to further reduce the probability that an error will occur, the first semaphore register address and the second semaphore register address can be selected to substantially maximize a Hamming distance between them. For example, if the first semaphore register address is selected to be 8'b00000000, then in order to maximize the Hamming distance between the first semaphore register address and the second semaphore register address, the second semaphore register address would be selected to be 8'b11111111. By substantially maximizing the Hamming distance between the first semaphore register address and the second semaphore register address, the probability that both the first semaphore register 110 and the second semaphore register 120 are written to erroneously in subsequent clock cycles is reduced, since in order for subsequent erroneous writes to occur, all the bits of common address bus 150 must flip to their opposite value (e.g. 8'b00000000 must flip to 8'b11111111). Although it may not always be practical to have the maximum possible Hamming distances between the first and second register addresses, those having skill in the art will appreciate that the greater the distance between them, the greater the protection that is afforded against errors, and thus can choose a Hamming distance which is substantially maximized given other system constraints (e.g. limitations on the possible range of addresses available for the first semaphore register 120 and the second semaphore register 130).

Figure 2:
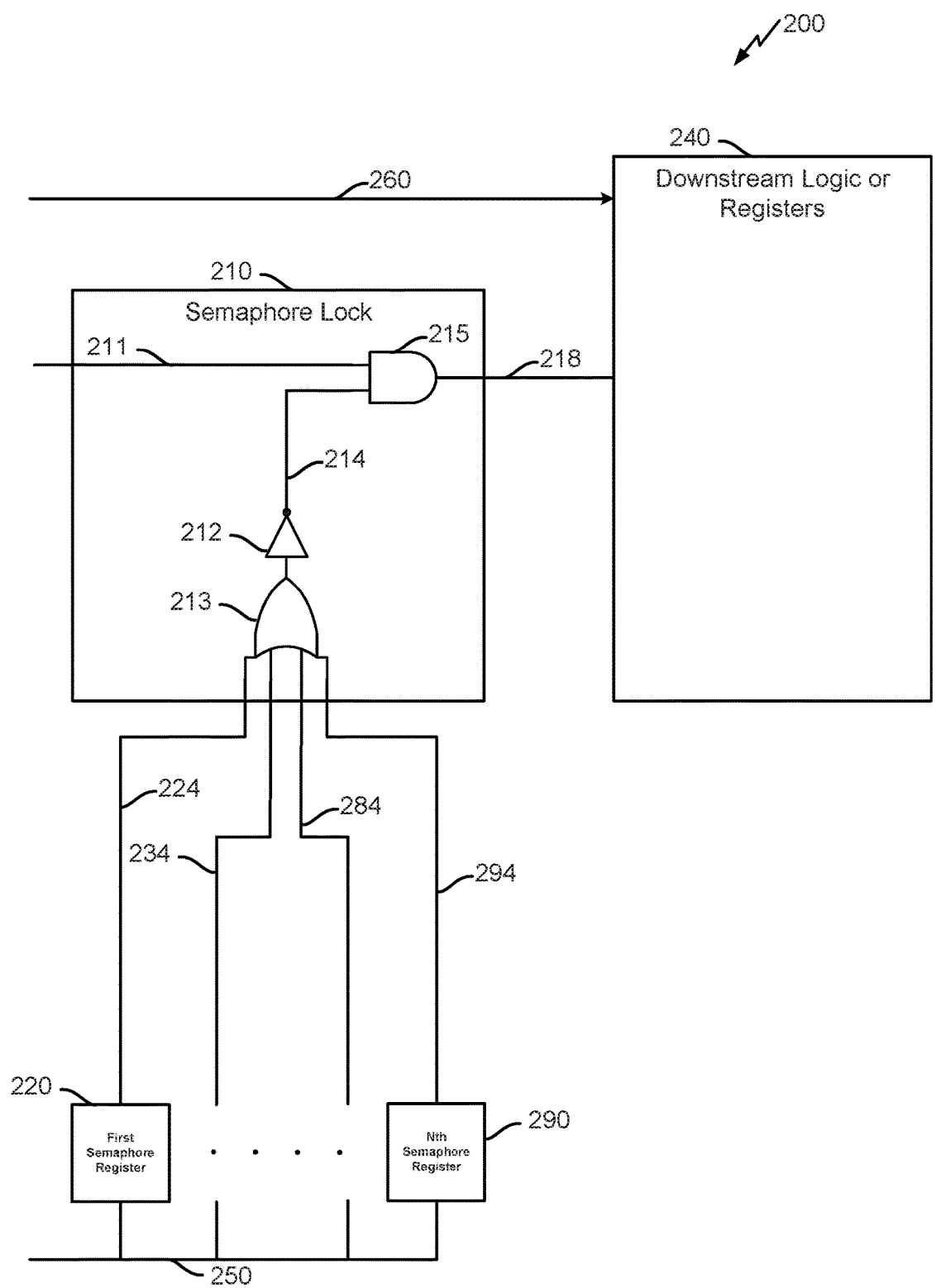
FIG. 2 shows a detailed diagram of certain aspects of a semaphore-based protection apparatus according to certain aspects of the present disclosure.

In order to provide a greater understanding of some aspects, FIG. 2 illustrates another apparatus for semaphore-based protection of power-domain-crossing signals generally denoted 200. Similar to FIG. 1, a signal 260 has a destination at downstream logic or registers 240 located in a first power domain (not illustrated) and a source in a second power domain (not illustrated). The downstream logic or registers 240 are responsive to a write enable signal 218 that is generated by a semaphore lock 210. In some aspects, the write enable signal 218 may be analogous to the protection signal 118 of FIG. 1. The write enable signal 218 controls whether the signal 260 is permitted to propagate to (i.e. be captured or stored by) the downstream logic or registers 240. When the write enable signal 218 is de-asserted, the downstream logic or registers 240 do not capture the value of signal 260, and thus, erroneous values appearing on signal 260 cannot corrupt the functionality of the downstream logic or registers 240.

The semaphore lock 210 is responsive to a software-controlled enable signal 211, and to a first semaphore value input 224, a second semaphore value input 234, an (n−1)th semaphore value input 284, and an (n)th semaphore value input 294. The semaphore lock 210 comprises OR-gate 213, which combines all 1-n semaphore value inputs 224, 234, 284, 294 and provides a combined input to an inverter 212, which generates a combined semaphore lock indicator 214. AND-gate 215 combines the software-controlled enable 211 with the combined semaphore lock indicator 214 to produce the write enable signal 218. Thus, in order for the write enable signal 218 to be asserted (and, thus, to allow writes to occur in the downstream logic or registers 240), both the software-controlled enable signal 211 and the combined semaphore lock indicator 214 must be asserted. This means that, in turn, all of the semaphore value inputs 224, 234, 284, 294 must be at their respective "unlock" values. As illustrated in this figure, when all of the semaphore value inputs 224, 234, 284, 294 are at a logic low value (in this example, the "unlock" value), the OR-gate 213 outputs a logic low value, which inverter 212 inverts to a logic high value to generate the combined semaphore lock indicator 214. Note that any single one of semaphore value inputs 224, 234, 284, 294 being a logic high value (in this example, the "lock" value) will cause the OR-gate 213 to output a logic high value, which inverter 212 will invert to a logic low value to generate the combined semaphore lock indicator 214. If the combined semaphore lock indicator 214 is a logic low value, then the write enable signal 218 will be de-asserted, regardless of the value of the software-controlled enable signal 211.

The semaphore value inputs 224, 234, 284, 294 are provided by a first semaphore register 220, a second semaphore register (not illustrated), . . . , an (n−1)th semaphore register (not illustrated), and an (n)th semaphore register 290, respectively. Similar to FIG. 1, the 1-n semaphore registers 220, 290 are coupled to and addressed by a common address bus 250 (which may have its source in either the second power domain or the first power domain, as previously discussed in regards to FIG. 1), meaning that only one of the 1-n semaphore registers 220, 290 may be written to in a single clock cycle. Thus, in order to open the semaphore lock 210 (assuming all semaphore registers 220, 290 are at the "lock" value), n clock cycles are required to accomplish to task of writing the "unlock" value into each of the n semaphore registers 220, 290. The number of semaphore registers is thus a design choice, and may depend on physical area available, size of available address space, system timing constraints, and other considerations which will be apparent to one having skill in the art. In some aspects, the n semaphore registers 220, 290 are addressable and writable by software, such as an operating system or kernel.

When more than two semaphore registers are employed to control the semaphore lock, as in FIG. 2, the associated register addresses for the semaphore registers may be selected such that the Hamming distance between any pair of the semaphore registers is substantially equal. For example, for the case of three semaphore registers, the addresses may be selected as 8'b11000111, 8'b11111000, and 8'b00111111.

In some aspects, the semaphore registers may be described as "means for storing a semaphore value." The common address bus may be described as "means for commonly addressing the means for storing." The semaphore lock may be described as "means for locking."

Figure 3:
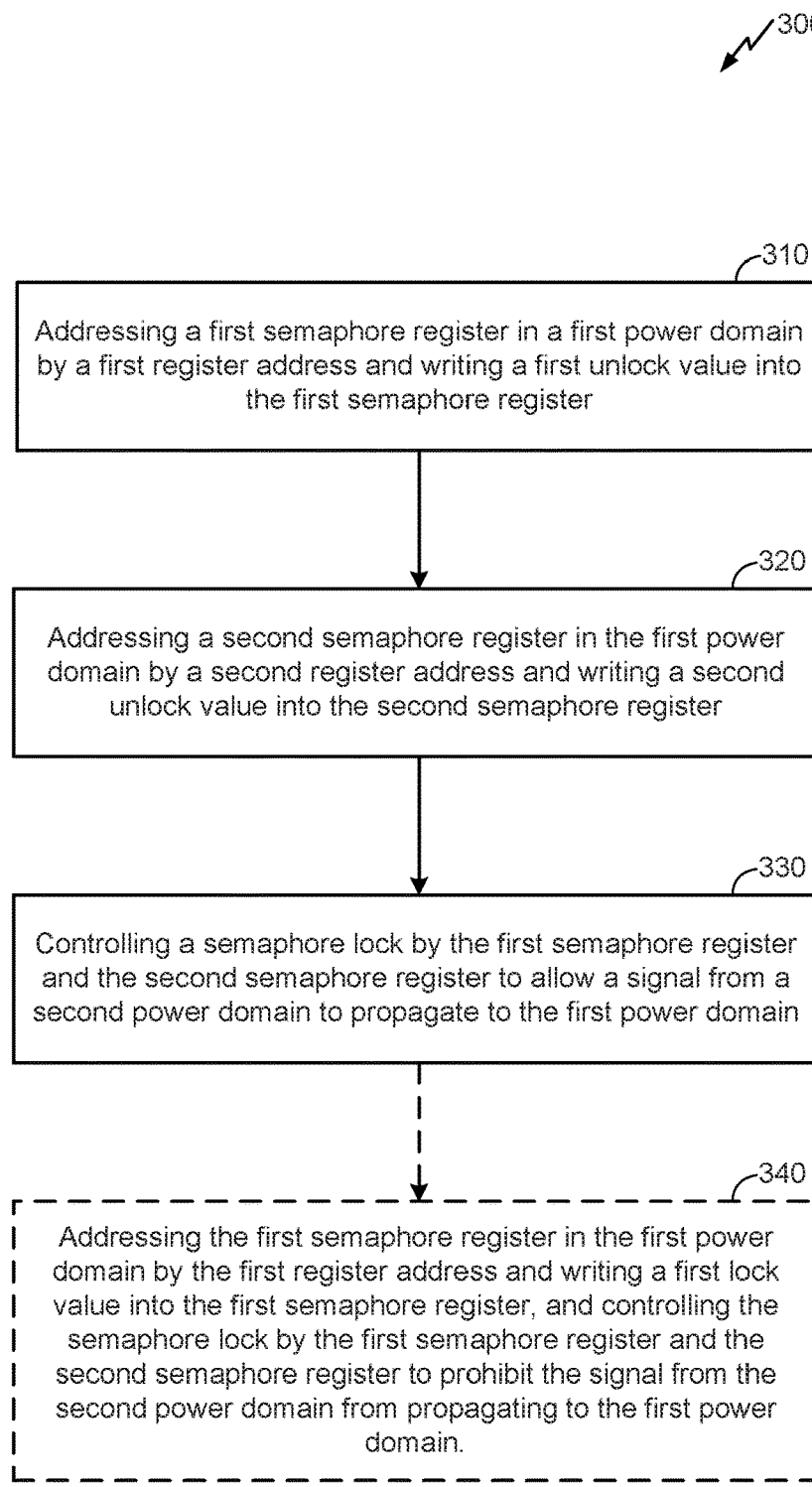
FIG. 3 shows a block diagram of a method of using a semaphore-based protection apparatus according to certain aspects of the present disclosure.

In order to illustrate exemplary operations of the apparatus 100 of FIG. 1 or the apparatus 200 of FIG. 2, FIG. 3 illustrating a method of using a semaphore-based protection apparatus 300 is provided. Selected elements of FIG. 1 and FIG. 2 may be referred to in the description of method 300, but such references should be understood as being by way of example and illustration only, and not by way of limitation, and those skilled in the art will readily understand how the method 300 may be implanted with respect to FIG. 1, FIG. 2, and other aspects of the present disclosure not explicitly described The method 300 begins at block 310 with addressing a first semaphore register in a first power domain by a first register address and writing a first unlock value into the first semaphore register. For example, the first semaphore register 120 of FIG. 1 has its associated first semaphore register address asserted on the common address bus 150, and a first unlock value is written into the first semaphore register 120 via the first semaphore value input 122. In some aspects, block 310 may occur during a first clock cycle of apparatus 100.

The method continues at block 320 with addressing a second semaphore register in the first power domain by a second register address and writing a second unlock value into the second semaphore register. For example, the second semaphore register 130 of FIG. 1 has its associated second semaphore register address asserted on the common address bus 150, and a second unlock value is written into the second semaphore register 130 via the second semaphore value input 132. In some aspects, block 320 may occur during a second clock cycle of apparatus 100, subsequent to the first clock cycle of apparatus 100.

The method continues at block 330 with controlling a semaphore lock by the first semaphore register and the second semaphore register to allow a signal from a second power domain to propagate to the first power domain. For example, once the first semaphore register 120 and the second semaphore register 130 have had unlock values written in subsequent clock cycles by being respectively addressed on the common address bus 150 and provided the unlock values to the semaphore lock 110 on the first semaphore register input 124 and the second semaphore register input 134, the semaphore lock will permit the signal 160 to propagate to the downstream logic or registers 140. In some aspects, the signal 160 being permitted to propagate to the downstream logic or registers may include being captured at a storage element of the downstream logic or registers 140.

The method may further include, at block 340, addressing the first semaphore register in the first power domain by the first register address and writing a first lock value into the first semaphore register, and controlling the semaphore lock by the first semaphore register and the second semaphore register to prohibit the signal from the second power domain from propagating to the first power domain. For example, a "lock" value may be written into the first semaphore register 120 via the first semaphore value input 122 in response to the first semaphore register address being asserted on the common address bus. In response to the "lock" value being written into the first semaphore register 120 and provided to the semaphore lock 110 via the first semaphore register input 124, the protection signal 118 from the semaphore lock 110 may prohibit signal 160 from being propagated to the downstream logic or registers 140. In some aspects, once the semaphore lock 110 has been "locked" in block 340, the second power domain may be power collapsed without introducing errors into the downstream logic or registers 140 located in the first power domain.

In some aspects, the writes to the first semaphore register and second semaphore register described in blocks 310, 320, and 340 may be under the control of software such as an operating system or kernel. The software may be responsible for asserting the appropriate register address on the common address bus, and for providing the appropriate lock or unlock value on the respective semaphore value input. The software may further be responsible for ensuring that a particular write order expectation with respect to the semaphore value registers is maintained. The software may be embodied as instructions stored on a non-transitory computer-readable medium and executed by a processor.

Although the semaphore registers herein have been illustrated as single-bit registers, the teachings of the present disclosure are not limited to single-bit registers. The semaphore registers may have any bit width selected by the designer, and those skilled in the art will readily be able to adapt the illustrated semaphore lock to accommodate differing bit widths of the associated semaphore registers. For example, in a multi-bit semaphore register, a single multi-bit value may be defined as the "unlock" value, and all over values are treated as "lock" values. Also, as with the semaphore register addresses, the "unlock" values for the multi-bit semaphore registers may be selected to substantially maximize a Hamming distance between each pair of multi-bit semaphore registers.

Figure 4:
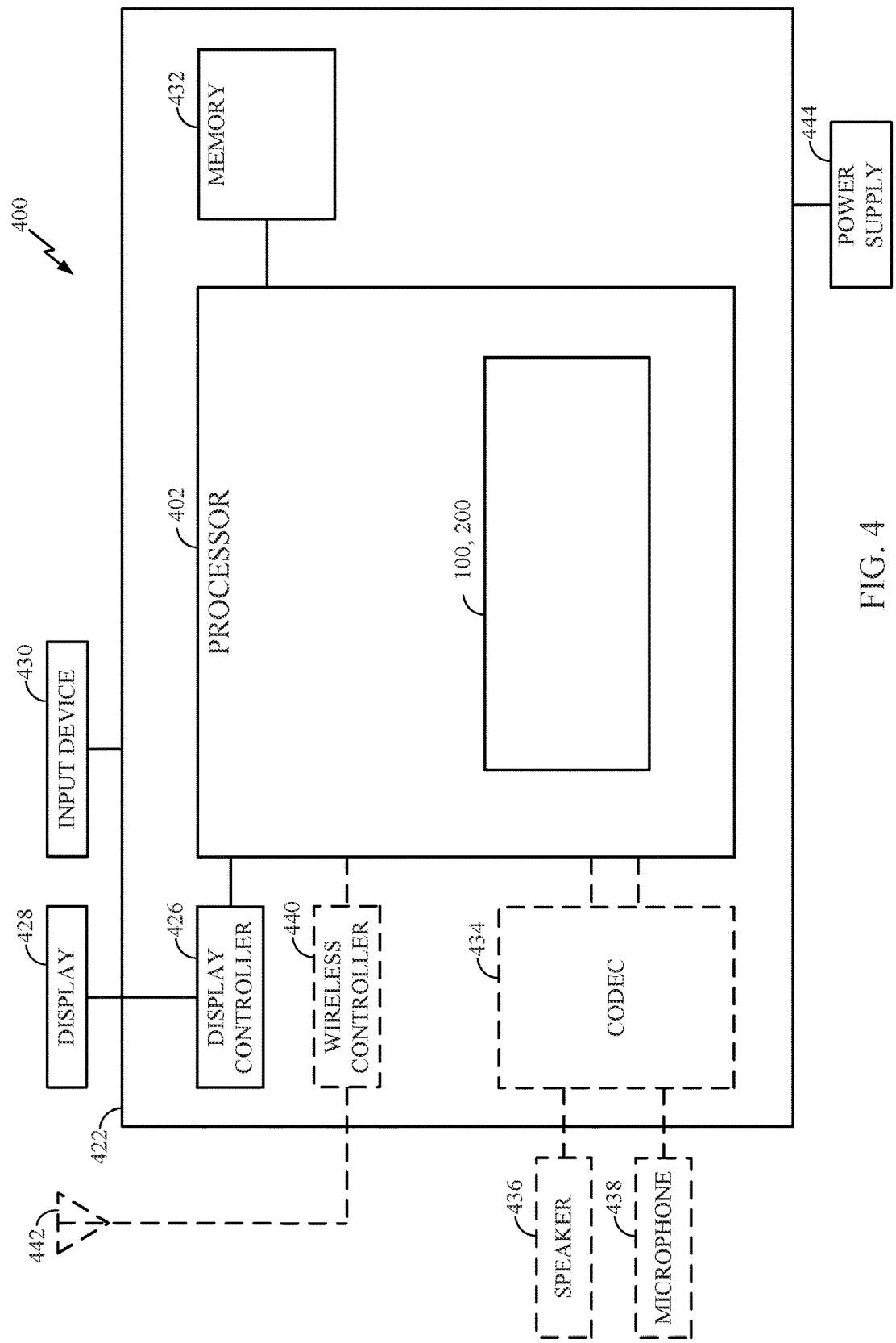
FIG. 4 shows a system-level diagram incorporating a semaphore-based protection apparatus according to certain aspects of the present disclosure.

An example apparatus in which aspects of this disclosure may be utilized will now be discussed in relation to FIG. 4. FIG. 4 shows a diagram of a computing device 400 incorporating a semaphore-based protection apparatus as described with respect to FIG. 1 and FIG. 2, which may be operable in accordance with the method described in FIG. 3. In that regard, the system 400 includes a processor 402 which may incorporate the apparatus 100 of FIG. 1 or apparatus 200 of FIG. 2, and a memory 432 coupled to the processor 402, which may store non-transitory computer-readable instructions that, when executed by the processor 402, may perform the method 300 of FIG. 3.

The system 402 also shows controller 426 that is coupled to processor 402 and to display 428. In some cases, computing device 400 may be used for wireless communication and FIG. 4 also shows optional blocks in dashed lines, such as coder/decoder (CODEC) 434 (e.g., an audio and/or voice CODEC) coupled to processor 402 and speaker 436 and microphone 438 can be coupled to CODEC 434; and wireless antenna 442 coupled to wireless controller 440 which is coupled to processor 402. Where one or more of these optional blocks are present, in a particular aspect, processor 402, display controller 426, memory 432, and wireless controller 440 are included in a system-in-package or system-on-chip device 422.

Accordingly, a particular aspect, input device 430 and power supply 444 are coupled to the system-on-chip device 422. Moreover, in a particular aspect, as illustrated in FIG. 4, where one or more optional blocks are present, display 428, input device 430, speaker 436, microphone 438, wireless antenna 442, and power supply 444 are external to the system-on-chip device 422. However, each of display 428, input device 430, speaker 436, microphone 438, wireless antenna 442, and power supply 444 can be coupled to a component of the system-on-chip device 422, such as an interface or a controller.

It should be noted that although FIG. 4 generally depicts a computing device, processor 402 and memory 432, may also be integrated into a mobile phone, a communications device, a computer, a server, a laptop, a tablet, a personal digital assistant, a music player, a video player, an entertainment unit, and a set top box, or other similar devices.

It is to be appreciated that the present disclosure is not limited to the terminology used above to describe the present disclosure. For example, a power domain may also be referred to as a power island, a voltage domain, etc.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the invention can include a computer readable media embodying a method for controlling a semaphore lock by first and second semaphore registers. Accordingly, the invention is not limited to illustrated examples and any means for performing the functionality described herein are included in aspects of the invention.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any particular order. Furthermore, although elements of the invention may be described or claimed in the singular, the plural is contemplated unless limitation to the singular is explicitly stated.

What is claimed is:

1. An apparatus, comprising:
   first and second semaphore registers disposed in a first power domain;
   a common address bus coupled to the first and second semaphore registers; and
   a semaphore lock disposed in the first power domain and coupled to the first and second semaphore registers; wherein
   the semaphore lock is adapted to be controlled by the first and second semaphore registers, and the semaphore lock is further adapted to control whether a signal from a second power domain is permitted to propagate to the first power domain.

2. The apparatus of claim 1, wherein the signal from the second power domain is coupled to a storage element in the first power domain, and the semaphore lock controls whether the signal from the second power domain is permitted to be captured by the storage element.

3. The apparatus of claim 1, wherein the first semaphore register is addressed by a first register address and the second semaphore register is addressed by a second register address.

4. The apparatus of claim 3, wherein the first register address and the second register address are selected such that a Hamming distance from the first register address to the second register address is substantially maximized.

5. The apparatus of claim 3, wherein a write order expectation is enforced with respect to the first semaphore register and the second semaphore register.

6. The apparatus of claim 5, wherein the first semaphore register is selected by assertion of the first register address over the common address bus and is written during a first cycle, and the second semaphore register is selected by assertion of the second register address over the common address bus and is written during a second cycle subsequent to the first cycle.

7. The apparatus of claim 1, further comprising a third semaphore register disposed in the first power domain, the third semaphore register coupled to the common address bus and addressed by a third register address, wherein a Hamming distance between each pair of addresses selected from the first register address, the second register address, and the third register address is substantially equal.

8. The apparatus of claim 1, wherein each of the first and second semaphore registers comprises a single-bit register.

9. The apparatus of claim 1, wherein each of the first and second semaphore registers comprises a multi-bit register, each of the first and second semaphore registers having an associated single multi-bit unlock value.

10. The apparatus of claim 1, wherein the first and second semaphore registers are software-writable.

11. The apparatus of claim 1, integrated into a device selected from the group consisting of a mobile phone, a communications device, a computer, a server, a laptop, a tablet, a personal digital assistant, a music player, a video player, an entertainment unit, and a set top box.

12. A method, comprising:
    addressing a first semaphore register in a first power domain by a first register address and writing a first unlock value into the first semaphore register;
    addressing a second semaphore register in the first power domain by a second register address and writing a second unlock value into the second semaphore register; and
    controlling a semaphore lock by the first semaphore register and the second semaphore register to allow a signal from a second power domain to propagate to the first power domain.

13. The method of claim 12, further comprising capturing the signal at a storage element in the first power domain.

14. The method of claim 12, further comprising addressing the first semaphore register in the first power domain by the first register address and writing a first lock value into the first semaphore register; and
    controlling the semaphore lock by the first semaphore register and the second semaphore register to prohibit the signal from the second power domain from propagating to the first power domain.

15. The method of claim 14, further comprising power collapsing the second power domain.

16. The method of claim 12, further comprising enforcing a write order expectation with respect to the first semaphore register and the second semaphore register.

17. The method of claim 16, further comprising writing the first unlock value into the first semaphore register in a first cycle, and writing the second unlock value into the second semaphore register in a second cycle subsequent to the first cycle.

18. The method of claim 12, wherein writing the first unlock value and writing the second unlock value are controlled by software.

19. An apparatus, comprising:
    first and second means for storing a semaphore value disposed in a first power domain;
    a means for commonly addressing the means for storing coupled to the first and second means for storing a semaphore value; and
    a means for locking disposed in the first power domain and coupled to the first and second means for storing a semaphore value; wherein
    the means for locking is adapted to be controlled by the first and second means for storing a semaphore value, and the means for locking is further adapted to control whether a signal from a second power domain is permitted to propagate to the first power domain.

20. The apparatus of claim 19, wherein the first means for storing a semaphore value is written during a first cycle, and the second means for storing a semaphore value is written during a second cycle subsequent to the first cycle.

21. A non-transitory computer readable medium comprising instructions which, when executed by a processor, cause the processor to:

address a first semaphore register in a first power domain by a first register address during a first cycle and write a first unlock value into the first semaphore register;

address a second semaphore register in the first power domain by a second register address during a second cycle subsequent to the first cycle and write a second unlock value into the second semaphore register; and control a semaphore lock by the first semaphore register and the second semaphore register to allow a signal from a second power domain to propagate to the first power domain.

22. The non-transitory computer readable medium of claim 21, further comprising instructions which, when executed by the processor, cause the processor to:

address the first semaphore register in the first power domain by the first register address and write a first lock value into the first semaphore register; and control the semaphore lock by the first semaphore register and the second semaphore register to prohibit the signal from the second power domain from propagating to the first power domain.

\* \* \* \* \*